United States Patent [19]

Chandler et al.

[11] 4,024,334

[45] May 17, 1977

[54] ADSORBENT MATERIALS

[75] Inventors: Bruce Veness Chandler, Chatswood; Robert Leonard Johnson, North Ryde, both of Australia

[73] Assignee: Commonwealth Scientific and Industrial Research Organization, Campbell, Australia

[22] Filed: Feb. 20, 1975

[21] Appl. No.: 551,291

[30] Foreign Application Priority Data

Feb. 21, 1974    Australia ..................... 6670/74

[52] U.S. Cl. ........................... 536/65; 426/442; 426/478; 536/69
[51] Int. Cl.² ................. C08B 3/06; C08B 3/18
[58] Field of Search ............ 260/225, 227, 230; 536/65, 69

[56]    References Cited

UNITED STATES PATENTS

| | | | |
|---|---|---|---|
| 632,605 | 9/1899 | Weber et al. | 260/225 |
| 2,339,631 | 1/1944 | Fletcher et al. | 536/65 |
| 2,346,350 | 4/1944 | Berl et al. | 536/69 |
| 2,489,128 | 11/1949 | Fox et al. | 260/230 |
| 2,489,143 | 11/1949 | Kneisley | 260/230 |
| 2,722,528 | 11/1955 | Johnson | 260/230 |
| 2,740,723 | 4/1956 | Voris | 260/230 |
| 2,809,191 | 10/1957 | Sloan et al. | 260/225 |
| 3,369,007 | 2/1968 | Flodin | 260/225 |

FOREIGN PATENTS OR APPLICATIONS 402,730    3/1932    United Kingdom ............... 260/225

*Primary Examiner*—Ronald W. Griffin
*Attorney, Agent, or Firm*—Cushman, Darby & Cushman

[57]    ABSTRACT

Cellulose esters, such as cellulose acetate and/or cellulose acetate butyrate, prepared in the form of gel beads are active as adsorbents, especially for debittering of fruit juices by removal of limonin.

12 Claims, No Drawings

ADSORBENT MATERIALS

This invention relates to adsorbents, and in particular to adsorbents which may be used for the treatment of fruit juices, especially citrus fruit juices, to reduce the bitterness thereof.

Bitterness in citrus fruits and their products is due to limonoid principles, predominantly limonin, and/or flavonoid principles, predominantly naringin and neohesperidin. These principles have been discussed generally by J. F. Kefford and B. V. Chandler in Chapters 13 and 14 of "The Chemical Constituents of Citrus Fruits" (Academic Press — 1970).

The distribution of limonoid and flavonoid bitter principles varies from fruit to fruit. In sweet oranges such as Navel oranges, the limonoids are generally dominant, but Seville oranges (used for marmalade) have a dominant flavonoid component. In lemons, limonoids are present with very little flavonoid component, whereas in grapefruit, both are present, flavonoids being dominant in the fresh juice but limonoids being most important in the processed juice.

Briefly, limonoid bitterness is due to the presence of the dilactone limonin, a tetranortriterpenoid of formula $C_{26}H_{30}O_8$, which is initially present in the albedo of oranges but which passes into orange juice on standing or heating. At concentrations of 8-12 ppm, the juice becomes detectably bitter and in the paper "The Removal of Limonin from Bitter Orange Juice" by B. V. Chandler, J. F. Kefford and G. Ziemelis, in the Journal of the Science of Food and Agriculture, Vol. 19, No. 2, Feb. 1968, pages 83-86, it is shown that removal of limonin can be effected by treatment of juice with polyamide powders. A two stage treatment is found to be the most successful because the preferential adsorption of flavonoids, such as hesperidin, which contain phenolic groups, by polyamides interferes with the limonin removal in a single stage treatment. A major disadvantage of the polyamide adsorption process, however, is that the use of adsorbents as a powder requires the centrifugation of the juice to serum and pulp, the pulp being added back to the serum after the latter has been treated with the adsorbent. Moreover, a substantial amount of the ascorbic acid (vitamin C) in the orange juice is removed (up to 30 percent) and the two-stage treatment, although efficient, has obvious economic disadvantages.

The flavonoid bitterness is due to the presence of flavonoid neohesperiodosides (as distinct from rutinosides, which are substantially tasteless). Naringin, a flavonone neohesperiodoside, predominates in grapefruit, but is also present with neohesperidin, another neohesperidoside, in bitter oranges, such as Seville oranges. One of the most recent techniques for removing flavonoid bitterness, described in French patent specification No. 2,125,539 (to SNAM Progetti S.P.A.), involves the use of enzymic action to convert naringin into non-bitter components. The enzyme preferred for this technique by inventors D. Dinelli and F. Morisi is naringinase incorporated into certain polymers as supports or carriers.

In general, and contrary to the statement made in the introduction of the aforementioned French patent specification No. 2,125,539, limonoid bitterness is the most important in processed citrus products.

It is an object of the present invention to provide a new adsorbent which may be used for removing limonoid bitterness from fruit juices, in a one stage or continuous operation, without the attendant disadvantages of the use of polyamide powders mentioned above, namely the need for a centrifugation step and the concurrent removal of large amounts of vitamin C from the juice.

To achieve this objective the present invention utilizes the discovery that certain materials not previously noted as adsorbents, namely cellulose esters — including those suggested by D. Dinelli and F. Morisi as carriers for naringinase enzymes in the removal of flavonoid bitterness in French patent specification No. 2,215,539 — may be used successfully as adsorbents, especially for the removal of limonin from fruit juice and that this adsorption is more selective than that obtained with polyamide powders used hitherto, so that only small amounts of ascorbic acid are removed from the juice. As a typical result flowing from this invention, Navel oranges, at present processed on a relatively small scale because of their high limonin content, can now be used in quantity for the preparation of orange juice, thus extending the orange juice processing period.

According to the present invention, there is provided an adsorbent material comprising a gel bead containing at least one cellulose ester material.

In another aspect, this invention provides a method of preparing the adsorbent material as described above, which comprises the steps of forming, at an elevated temperature, a dispersion of a solution of at least one cellulose ester material in a liquid with which the solution is immiscible, cooling the dispersion and separating beads of the cellulose ester material from the liquid.

The adsorbent material of the present invention is found to be particularly suitable for the adsorption of bitter principles from citrus fruit juices. By way of example, the use of beads in accordance with the present invention of size 6.4 to 1.7 mm diameter have been found to provide effective contact between such juice and the adsorbent when packed in a column and to allow whole juice to pass through the column without the need for prior centrifugation to remove pulp and the like.

Thus, in yet a further aspect of this invention there is provided an adsorbent column containing or consisting of the adsorbent material described above.

Preferably, the cellulose ester material is a cellulose acetate and/or cellulose acetate butyrate.

As well as being suitable for use in columns, the beads of this invention can be effectively used in batch treatments of fruit juices for the removal of bitter principles therefrom. In such treatments a single batch of beads may be used a number of times with their activity being regenerated between uses simply by soaking in water. The volume of water used for regeneration must be much greater than the volume of juice treated if the initial activity of the beads is to be restored fully. The beads may be conveniently enclosed in, for example, nylon mesh bags for these batch treatments.

Typical solvents which may be used in the preparation of the adsorbent material of this invention include ethanol where the cellulose ester is cellulose acetate butyrate and aqueous dimethyl formamide, aqueous acetone and aqueous acetic acid where the cellulose ester is cellulose acetate.

Preferably, the cellulose ester material is dissolved in warm or hot solvent and the solution dispersed into the immiscible liquid. Dispersion of the solution in the immiscible liquid may be effected by adding the solution into warm liquid with stirring or other agitation, or by a "drop tower" technique in which the solution is dropped into relatively cool liquid.

Typical liquids which may be used for the formation of the beads of this invention include petroleum oil and paraffin oil (medicinal paraffin).

Preferably, a surfactant material is added to the liquid to prevent agglomeration or lumping together of the beads during formation and detergents such as "Teepol," calcium carbonate powder and fine cellulose acetate powder, for example, may be used as suitable surfactant materials.

The following Examples illustrate the preparation and use of the adsorbent material of the present invention.

EXAMPLE I

Cellulose acetate (6g) was dissolved in hot solvent (30ml dimethyl formamide plus 13ml water). The hot solution was then poured into petroleum oil (900ml) at approximately the same temperature as the cellulose acetate solution. By stirring, the cellulose acetate solution was dispersed into globules. On cooling the dispersion (for example, by addition of water) the globules set to beads of cellulose acetate gel. 10ml of "Teepol" detergent was added initially to the oil to prevent the globules from sticking to each other while setting was in progress. The gel beads were filtered off from the oil, washed with detergent solution to remove adhering oil, and then soaked and washed with water to leach solvent out from the beads. Beads were obtained in the sizes; larger than 6.4 mm diameter, 1ml; 6.4 – 1.7 mm diameter, 40ml; smaller than 1.7 mm diameter, 5ml.

The beads of size 6.4 – 1.7 mm diameter were found to give effective contact with fruit juice when packed in an adsorbent column.

A glass column of 39mm internal diameter and 150cc bed volume (BV) was packed with cellulose acetate (CA) beads (1.7 – 6.4mm diameter) which had been prepared as described above. The weight of beads occupying the BV was 93g of which 16g was CA and 77g was water, i.e., CA:water = 1:4.8. A bitter juice (A) with initial limonin content of 29 ppm and sugar content of 9.8° Brix was passed through a 0.02 inch screen to remove the coarser particles, and then passed upward through the gel bed at a rate of 2.1 BV/hr (5cc/min). Being less dense than the juice, the water contained in the beads tended to float as a layer on top of the juice and so pass as the initial effluent from the top of the column. After 1 BV had passed through the column, the Brix of the effluent was 8.7°, and after another BV, 9.8°. The first BV of effluent was discarded, and the following 7 bed volumes of effluent were collected, giving 1050cc of juice with an overall limonin content of 15.1 ppm. Thus a 48% reduction in limonin had been achieved at a juice throughput of 5cc/min. The limonin content of the effluent rose progressively during the run, from 13.6 ppm in the first BV collected to 16.6 in the last. A simple washing with 7 BV of distilled water was sufficient to re-activate the gel bed before experimental runs with 2 other juices (B and C), which gave the results recorded in Table I below.

TABLE I

| | Juice A | Juice B | Juice C |
|---|---|---|---|
| No. of bed volumes put through | 7 | 8 | 11 |
| Volume of juice treated (cc) | 1050 | 1200 | 1650 |

TABLE I-continued

| | Juice A | Juice B | Juice C |
|---|---|---|---|
| Initial limonin content of juice (ppm) | 29.0 | 30.8 | 34.7 |
| Limonin content of first BV (ppm) | 13.6 | 11.6 | 8.8 |
| Limonin content of final BV (ppm) | 16.6 | 25.6 | 18.7 |
| Overall limonin content of effluent (ppm) | 15.1 | 18.4 | 15.0 |
| Limonin removal (%) | 48 | 40 | 57 |

EXAMPLE 2

Cellulose acetate (24g) was dissolved in hot solvent (130ml dimethyl formamide and 52ml water) and the mixture poured into warm oil as described previously. Calcium carbonate powder (12g) was added slowly with stirring, and stirring was continued, with cooling as before, until the globules set to beads of cellulose acetate gel. The gel beads were filtered from the oil and washed with dilute acid, such as citric, to remove the calcium carbonate and then steeped in running water to remove solvent, oil, acid, and other adjuncts to their preparation. In this way 225ml of 3–6mm beads and 15ml of <3mm beads were obtained.

EXAMPLE 3

Cellulose acetate (24g) was dissolved in hot solvent (100ml glacial acetic acid and 100ml water) and the solution poured into stirred medicinal paraffin (paraffin oil BP) under conditions similar to those described in Example 1. Fine cellulose acetate powder (3g), which had passed through a 200-mesh sieve, was then added to the stirred mixture. On cooling as before, the beads were filtered off, and steeped in running water to remove the various manufacturing adjuncts. In this way, 220ml of 3–6mm beads and 40ml of <3mm beads were obtained.

EXAMPLE 4

Cellulose acetate (12g) was dissolved in aqueous acetone (60ml acetone and 26ml water) under reflux and the polymer solution, held sufficiently hot to retain the cellulose acetate in solution, was dropped into a column of medicinal paraffin (paraffin oil BP), and the gel beads, once formed, were removed continuously by a stirred vortex with an aqueous phase underlying the oil. To operate the process continuously without the need to cool the oil, the oil column needed to be about 3.5 feet deep to ensure that the droplets, as they descended through the oil, cooled and set into gel beads; shorter columns would be possible if the oil could be kept cool, e.g., by running water. Using an oil column of 3.5 feet, 100ml of 3–6mm gel beads were obtained.

Beads prepared by the methods described in Examples 2, 3 and 4 were comparable in activity to beads prepared by the method of Example I.

Table 2 below presents the results of three experiments in which cellulose acetate gel beads (CA:water = 1:5.6) were used to de-bitter orange juice by gently shaking the beads with juice for 45 minutes. It may be desirable to take steps to prevent oxidative deterioration of juice during this process but it is not essential to the de-bittering treatment; the results reported in this Table were obtained in tests carried out in an atmosphere of nitrogen. It may also be desirable to carry out the process at reduced temperature; the results reported were obtained with juice at room temperature.

TABLE 2

|  | Expmt A | Mean from Expmt B & C |
|---|---|---|
| Wt. of beads/vol juice (g/100 ml) | 5.8 | 12.2 |
| Initial limonin content of juice (ppm) | 41.4 | 57.4 ± 1.8 |
| Final limonin content of juice (ppm) | 27.5 | 19.1 ± 1.9 |
| Limonin removal (%) | 34 | 63 – 70 |

In a further use of gel beads batchwise, nylon mesh bags were used to enclose CA gel beads (12.7g of 3mm diameter beads with CA:water ratio of 1:5.6). The bags were shaken gently with 150ml orange juice for 45 minutes under an atmosphere of nitrogen at room temperature (see above examples for comment on temperature and atmosphere conditions). After use, the bags were kept under 1% metabisulphite solution (150 mls) for a few days before the next run. Analyses of the limonin contents of the juices and wash waters are given in Table 3 for a series of 3 runs carried out in duplicate (mean results reported).

TABLE 3

|  | Expmt A | Expmt B | Expmt C |
|---|---|---|---|
| Initial limonin content of juice (ppm) | 22.6 | 20.7 | 19.1 |
| Final limonin content of juice (ppm) | 12.7 | 13.5 | 15.2 |
| Limonin removal (%) | 44 | 35 | 20 |
| Amount of limonin removed (mg) | 1.485 | 1.080 | 0.585 |
| Limonin content of wash water (ppm) | 2.8 | 3.3 | 4.3 |
| Amount of limonin recovered (mg) | 0.420 | 0.495 | 0.645 |

The above results demonstrate that beads of this invention can be effectively used in batch treatments a number of times with regeneration of activity simply by soaking in water between uses; however, the volume of water for regeneration must be much greater than the volume of juice treated if initial activity is to be restored fully.

The claims defining the invention are as follows:

1. An adsorbent material effective for the adsorption of limonoid principles from citrus fruit juices comprising discrete gel beads of a size within the range of 1.7 to 6.4 mm. diameter, such beads consisting essentially of at least one cellulose ester material selected from the group consisting of cellulose acetate and cellulose acetate butyrate and sufficient water to form a gel.

2. An adsorbent material as claimed in claim 1, in which the ester-to-water ratio is within the range of from 1:4.8 to 1:5.6 by weight.

3. A method of preparing an adsorbent material effective for the adsorption of limonoid principles from citrus fruit juices as claimed in claim 1, which comprises the steps of dissolving cellulose ester material selected from the group consisting of cellulose acetate and cellulose acetate butyrate in a hot solvent selected from the group consisting of (1) a mixture of a solvent for the ester miscible with water and water; and (2) a solvent for the ester miscible with water, adding the resulting hot solution of cellulose ester material to a heated liquid with which the said solution is immiscible whereby to cause substantially all of said cellulose ester solution to form a dispersion in said heated liquid, agitating the mixture to form globules of the cellulose ester solution dispersed in said heated liquid, cooling the dispersion to set the globules, washing the said globules to remove solvent therefrom and thereby form beads each consisting of cellulose ester and sufficient water to form a gel, and recovering the fraction of gel beads thus formed having a particle size between 1.7 mm and 6.4 mm.

4. A method as claimed in claim 3, wherein the solvent for the ester is ethanol and where the cellulose ester is cellulose acetate butyrate.

5. A method as claimed in claim 3, wherein the solvent for the ester is a mixture of water with dimethyl formamide, acetone or acetic acid and where the cellulose ester is cellulose acetate.

6. A method as claimed in claim 3, wherein the said immiscible liquid is petroleum oil or paraffin oil.

7. A method as claimed in claim 3, wherein a surfactant material is added to the immiscible liquid.

8. A method of preparing an adsorbent material effective for the adsorption of limonoid principles from citrus fruit juices as claimed in claim 1, which comprises the steps of dissolving cellulose ester material selected from the group consisting of cellulose acetate and cellulose acetate butyrate in a hot solvent selected from the group consisting of (1) a mixture of a solvent for the ester miscible with water and water; and (2) a solvent for the ester miscible with water, adding the resulting hot solution of cellulose ester material dropwise to a liquid with which the said solution is immiscible to form globules of the cellulose ester solution dispersed in said liquid, recovering the said globules from the said liquid, washing the said globules to remove solvent therefrom and thereby form beads, each consisting of cellulose ester and sufficient water to form a gel, and recovering the fraction of gel beads thus formed having a particle size between 1.7 mm. and 6.4 mm.

9. A method as claimed in claim 8, wherein the said immiscible liquid is petroleum oil or paraffin oil.

10. A method as claimed in claim 8, wherein a surfactant material is added to the immiscible liquid.

11. A method according to claim 8 wherein the solvent for the ester is ethanol and where the cellulose ester is cellulose acetate butyrate.

12. A method according to claim 8 wherein the solvent for the ester is a mixture of water with dimethyl formamide, acetone or acetic acid and where the cellulose ester is cellulose acetate.

* * * * *